(12) United States Patent
Yandle, II et al.

(10) Patent No.: US 11,644,132 B1
(45) Date of Patent: May 9, 2023

(54) STEAM DEFLECTOR SHIELD

(71) Applicant: S. Elwood Yandle, II, New Orleans, LA (US)

(72) Inventors: S. Elwood Yandle, II, New Orleans, LA (US); S. Elwood Yandle, III, Belle Chasse, LA (US)

(73) Assignee: S. E. Yandle, II, New Orleans, LA (US)

( * ) Notice: Subject to any disclaimer, the term of this patent is extended or adjusted under 35 U.S.C. 154(b) by 0 days.

(21) Appl. No.: 17/535,890

(22) Filed: Nov. 26, 2021

Related U.S. Application Data

(60) Provisional application No. 63/118,336, filed on Nov. 25, 2020.

(51) Int. Cl.
*F16L 23/00* (2006.01)
*F16L 55/16* (2006.01)
*F16L 55/168* (2006.01)

(52) U.S. Cl.
CPC ............. *F16L 23/003* (2013.01); *F16L 55/16* (2013.01); *F16L 55/168* (2013.01); *F16L 2201/20* (2013.01); *Y10T 29/49826* (2015.01)

(58) Field of Classification Search
CPC ..... F16L 23/003; F16L 23/167; F16L 23/006; F16L 55/16; F16L 55/168; F16L 57/00; F16L 58/187; F16L 59/106; F16L 59/16; F16L 59/184; F16L 2201/20; F16L 2201/30; F16L 35/00
USPC ...................................... 285/13, 45
See application file for complete search history.

(56) References Cited

U.S. PATENT DOCUMENTS

| | | | | |
|---|---|---|---|---|
| 798,649 | A | * | 9/1905 | Willink .................. F16L 23/167 285/13 |
| 2,699,960 | A | * | 1/1955 | Callery .................. F16L 23/167 285/13 |
| 2,744,815 | A | * | 5/1956 | Heck, Jr. .......................... 285/13 |
| 3,678,717 | A | * | 7/1972 | Eaton ...................... F16L 35/00 285/80 |
| 4,106,428 | A | | 8/1978 | Matthiessen |

(Continued)

FOREIGN PATENT DOCUMENTS

EP      1927805      6/2008

OTHER PUBLICATIONS

Drake Specialties; Safety Spray Shields for Containing and Detecting Hazardous Leaks and Sprays; 4 pages; Lafayette, Louisiana.

(Continued)

*Primary Examiner* — Zachary T Dragicevich
*Assistant Examiner* — William S. Choi
(74) *Attorney, Agent, or Firm* — Garvey, Smith & Nehrbass, Patent Attorneys, L.L.C.; Seth M. Nehrbass; Charles C. Garvey, Jr.

(57) ABSTRACT

Apparatus and method for shielding leakage from a flanged pipe coupling comprising: a housing having a front wall, a rear wall, and a top wall, the top wall depending downwardly to form side walls intermediate the front and rear walls thus forming a closure having a bottom which is open; wherein the housing contains an interior space in between the front and rear wall and below the top wall, the interior space shaped to fit around a flanged pipe coupling; and wherein the housing is shaped so as to prevent rotation of the apparatus with respect to the flanged pipe coupling.

17 Claims, 5 Drawing Sheets

(56) References Cited

U.S. PATENT DOCUMENTS

| | | | |
|---|---|---|---|
| 4,216,980 A | | 8/1980 | Shreve |
| 4,366,970 A | * | 1/1983 | Hogan, Jr. ............ F16L 23/003 285/45 |
| 4,403,794 A | | 9/1983 | Curran et al. |
| 4,441,694 A | | 4/1984 | Curran et al. |
| 5,312,137 A | | 5/1994 | Nee |
| 5,470,110 A | | 11/1995 | Hupe |
| 5,489,124 A | | 2/1996 | Nee et al. |
| 5,678,864 A | | 10/1997 | Brown |
| 5,957,503 A | | 9/1999 | Brown |
| 6,106,025 A | * | 8/2000 | Kang .............................. 285/45 |
| 8,925,969 B2 | | 1/2015 | Sonnier |
| 9,200,734 B2 | | 12/2015 | Webb et al. |
| 9,631,750 B1 | * | 4/2017 | Veazey ................ F16L 23/003 |
| 10,627,027 B1 | * | 4/2020 | Hutchinson .......... F16L 23/006 |
| 2012/0193907 A1 | | 8/2012 | Skarbövig |
| 2014/0360592 A1 | * | 12/2014 | Wilson .................... F16L 35/00 |

OTHER PUBLICATIONS

Gearench; Petal Flange Spray Deflector; Jul. 17, 2018; 1 page; Clifton, Texas.

Advance Products & Systems, Inc.; Safety Spray Shields for Flanges, Valves & Expansion Joints Contains and Detects Hazardous Sprayouts; Jan. 21, 2016; 8 pages; Lafayette, Louisiana.

Ramco-Safetyshields, LLC; Overview—Metal Safety Shields—For Demanding Applications at High Pressure and Temperature; https://ramco-safetyshields.com/products/metal-safety-shields/; Dec. 16, 2019 (3 pages).

P.E.P., A Ryan Herco Flow Solutions Company; How P.E.P. Safety Shields Protect . . . ; 11 pages; Branchburg, New Jersey.

Ramco—Safetyshields, LLC.; Safety Shields; https://ramco-safetyshields.com/products/spray-shields/; Dec. 16, 2019 (2 pages).

Ramco—Safetyshields, LLC.; The Standard in Quality Safety Shields; https://ramco-safetyshields.com/products/spray-guards/; Dec. 16, 2019 (3 pages).

* cited by examiner

STEAM DEFLECTOR SHIELD

CROSS-REFERENCE TO RELATED APPLICATIONS

Priority of our U.S. Provisional Patent Application Ser. No. 63/118,336, filed 25 Nov. 2020, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a uniquely configured safety deflector shield apparatus for use with bolted flanged pipe connections. More particularly, the present invention relates to an apparatus to deflect fluid spray in a particular direction in the event of leakage or a failed bolted, flanged connection.

2. GENERAL BACKGROUND OF THE INVENTION

Some devices for deflecting spray from flange couplings have been patented. For example, U.S. Pat. No. 5,678,864 discloses a "Quick Disconnect Safety Shield." According to the '864 patent, this safety shield can be quickly disconnected and has a purpose to protect adjacent equipment and personnel from any leakage. U.S. Pat. No. 5,470,110 provides a shielding device for deflecting unexpected discharge away from a mechanic who is unbolting flanges. Other patents either deflect or shield against spray or leakage.

The following possibly relevant patent documents are incorporated herein by reference: U.S. Pat. Nos. 4,106,428; 4,216,980; 4,403,794; 4,441,694; 5,312,137; 5,470,110; 5,489,124; 5,678,864; 5,957,503; 8,925,969; and 9,200,734; U.S. Patent Application Publication No.: 2012/0193907; and European Patent Document: EP 1 927 805.

All of our prior patents and patent applications are incorporated herein by reference, though this is not a continuation, continuation-in-part, or divisional of any prior patent application.

The following literature, copies which were submitted with our U.S. Provisional Patent Application Ser. No. 63/118,336, filed 25 Nov. 2020, incorporated herein by reference, is incorporated by reference: Drake Specialties Safety Spray Shields information, Gearench™ Petol™ Flange Spray Deflector information sheet, Advance Products & Systems safety spray shields production information, RAMCO® metal safety shields information, P.E.P. Safety Shields information sheet, RAMCO® safety shields information sheets, and RAMCO® Spra-Gard® Safety Shields information sheets. Applicant has not determined the dates of such information and therefore does not present the information as prior art, but merely as relevant art in the field today.

BRIEF SUMMARY OF THE INVENTION

The apparatus of the present invention provides an improved deflector shield. More specifically, the apparatus of the present invention includes a deflector shield apparatus for use with pipe flanges that are bolted together connecting pipelines or pipe sections together. Once installed, the deflector shield apparatus of the present invention preferably diverts escaping fluid (e.g., steam or other leakage) in a selected direction and away from harm. In one embodiment, the deflector shield apparatus of the present invention disallows rotation of the housing out of the desired position. In one embodiment, an installation of guard bolts preferably maintains the deflector shield apparatus housing from separating from the flanged bolted connection.

The present invention includes an apparatus for shielding leakage from a flanged pipe coupling comprising: a housing preferably having a front wall, a rear wall, and a top wall, the top wall preferably depending downwardly to form side walls intermediate the front and rear walls thus preferably forming a closure having a bottom which is open; wherein the housing preferably contains an interior space in between the front and rear walls and below the top wall, the interior space preferably shaped to fit around a flanged pipe coupling. In one embodiment, the housing is preferably shaped so as to prevent rotation of the apparatus with respect to the flanged pipe coupling.

In one or more preferred embodiments, the front wall and rear wall of the housing can extend from the top wall to the shaft of the coupling.

In one or more preferred embodiments, the front wall is preferably shaped so as to allow the securing of the front wall to one or more flanged pipe coupling bolts.

In one or more preferred embodiments, the housing can be secured to the pipe coupling bolts with one or more nuts.

In one or more preferred embodiments, the rear wall is preferably wider than the front wall, has a substantially u-shape, and surrounds approximately one half of the coupling shaft.

In one or more preferred embodiments, the side walls can be secured to each other.

In one or more preferred embodiments, one or more guard bolts can secure the side walls.

In one or more preferred embodiments, two guard bolts can secure the side walls.

In one or more preferred embodiments, the side walls preferably have a reinforcing plate where the coupling bolts are attached to the housing.

In one or more preferred embodiments, the housing can be made from 300 series stainless steel.

In one or more preferred embodiments, the housing is can be made of any material known in the art to be used for pipe shields or deflectors.

In one or more preferred embodiments, the apparatus of the present invention can be used to deflect steam.

In one or more preferred embodiments, the apparatus of the present invention can be used to deflect leakage.

In one or more preferred embodiments, the apparatus of the present invention can be used to deflect any material transported by pipe.

The present invention includes a method of deflecting leakage of material transported by pipe in a preferred direction using the apparatus of the present invention.

The present invention includes a flanged pipe connection shield apparatus comprising: a first pipe section fitted with a first annular flange; a second pipe section fitted with a second annular flange; a plurality of bolted connections that preferably hold the first and second annular flanges together in a connected flanges position, each bolted connection preferably including a flange bolt and a flange nut; a flow bore that preferably enables fluid flow from the first pipe section to the second pipe section and through the first and second annular flanges; a generally u-shaped housing having an interior that is preferably configured to collect and channel any fluid leaking from the flanges; the housing including an open end portion that preferably enables entry of the connected flanges to the housing interior; a first plate section that has a slot preferably sized and shaped to conform to part of the outer surface of the first pipe section; a second plate section having one or more slots that are each preferably sized and shaped to conform to a flange bolt; and a third plate section that defines a closed end generally opposite the open end, the third plate preferably spanning from the first plate section to the second plate section.

In one or more preferred embodiments, the second plate section can have multiple slots, each receptive of a flange bolt of the bolted connection.

In one or more preferred embodiments, the flange bolt, flange nut, second plate section and slot can be configured to prevent rotation of the housing relative to the pipe sections.

In one or more preferred embodiments, a flange bolt and flange nut preferably hold the second plate section against an annular flange.

In one or more preferred embodiments, a flange bolt and flange nut preferably compress the second plate into contact with the second flange.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
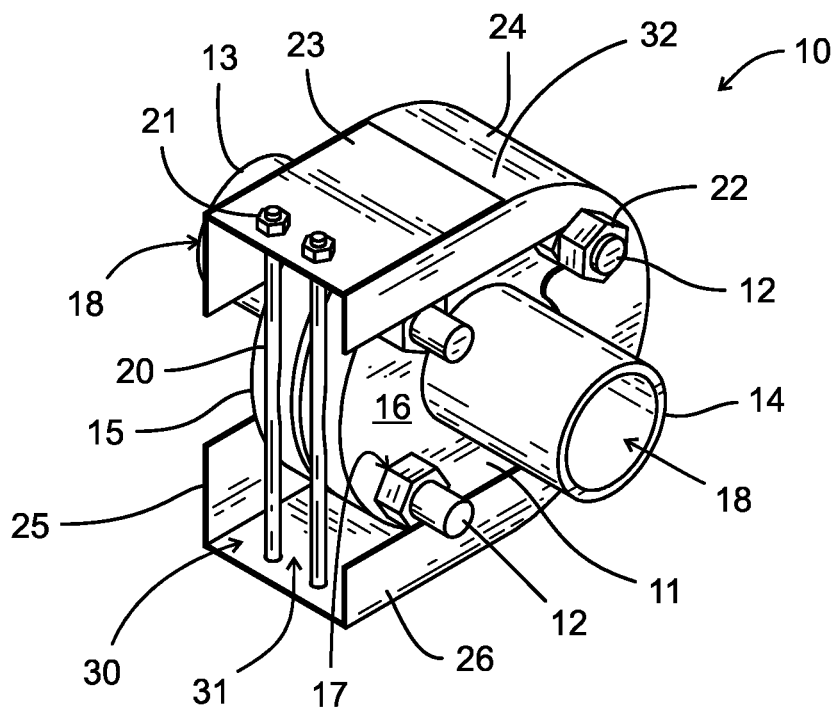
FIG. 1 is a perspective view of a preferred embodiment of the apparatus of the present invention wherein the guard bolts can be seen and wherein the apparatus is shown attached to a flanged pipe connection.

The aforementioned figures depict a preferred embodiment of the apparatus of the present invention, designated generally by the numeral 10. FIGS. 1-11 depict an embodiment which can be utilized for example with a flanged connection (e.g., 2 inch). In FIGS. 1-6, the deflector shield apparatus 10 is shown installed on a bolted flanged connection that connects one pipe section to another pipe section. The shield deflector apparatus 10 can vary in size and can be utilized in all bolted pipe flange connection sizes. Although the deflector shield apparatus 10 can be utilized to deflect fluid (e.g., steam) in a certain direction, the deflector shield can be utilized to deflect any fluid product. Although 300 series stainless steel is a preferred material for the deflector shield apparatus 10, the deflector shield apparatus 10 can be produced out of any material desired by a customer or end user. For example, the deflector shield could be made out of stainless steel (all grades included), steel, brass, or plastic.

FIGS. 1 through 6 present various views of a preferred embodiment of the apparatus of the present invention, designated generally by the numeral 10. In FIGS. 1-6, deflector shield apparatus 10 is installed on a flanged pipe connection 11. Such a flanged bolted connection or flanged pipe coupling 11 is well known. Such a coupling or flanged connection 11 preferably includes a first pipe section 13 connected (e.g., welded, threaded or slip on connection) to a first annular flange 15 and a second pipe section 14 that is connected (e.g., welded, threaded or slip on connection) to a second annular flange 16.

Flow bore 18 preferably enables fluid flow from first pipe section 13 to second pipe section 14 and through first and second annular flanges 15, 16. The flanges 15, 16 each have openings 17 that are preferably receptive of a bolt 12. Annular flanges 15, 16 preferably have multiple such openings 17 (e.g., four (4) as seen in FIGS. 1-6 or more as pipe 13, 14 diameters increase). Nuts 22 each attach to a bolt 12 to complete a bolted connection. The bolted connections can hold the pipe flanges 15, 16 together. Such pipe flanges 15, 16 that are connectable with bolted connections are commercially available and known. For example, see texasflange.com. Flanged, bolted connections are commonly used to join a first section of pipe to a second section of pipe. One popular type of flange is an annular weld neck flange wherein each pipe section is welded to a weld neck flange. Weld neck flanges are available in different sizes, different pressure values and can have different types of seals where the flanges are bolted together. A popular seal is a ring type joint or "RTJ".

If a seal leaks or fails, high pressure (for example, 150 psi or more) can generate a leak. In the case of steam, leakage can injure workers or nearby personnel. The apparatus 10 of the present invention can be quickly installed on a selected flanged, bolted connection 11. The apparatus of the present invention is shown in an installed position in FIGS. 1-6.

As seen in the figures, the apparatus 10 includes a housing, shroud or cover 32 that is preferably attached to a flanged pipe coupling or flanged connection 11 with guard bolts 20 and nuts 21 at connecting plates 23 (see FIGS. 1, 4 and 10-11). Nuts 22 that are attached to the flanged pipe coupling bolts 12 and also preferably attach to housing, cover or shroud 32. These nuts 22 preferably prevent housing 32 from rotating or moving laterally. The guard bolts 20 preferably prevent the housing 32 from separating from the flanged, bolted pipe connection 11.

Housing 32 preferably has a closed end 24 and an open end portion 30. Open end portion 30 enables insertion of coupling 11 into housing 32 interior 31. Closed end 24 can be curved as shown. The guard bolts 20 can be secured with nuts 21. Bolts 12 are preferably secured via the nuts 22 to reinforcement piece 28 at slots 29 (see FIG. 6). Housing 32 preferably has two side plates, front side plate 26 and rear side plate 25. Terms of direction are utilized for illustration purposes.

Figure 3:
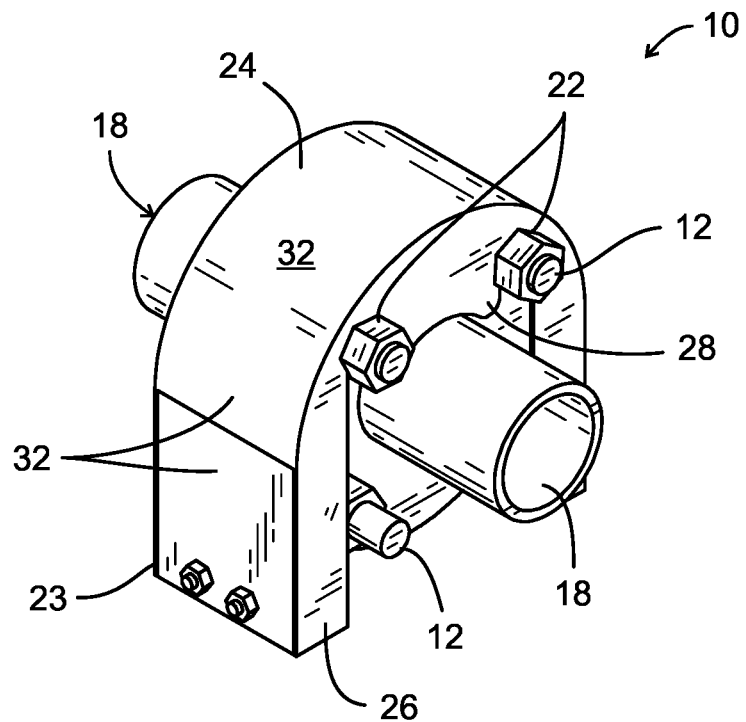
FIG. 3 is a 180° rotated view of the embodiment FIG. 2.
Figure 4:
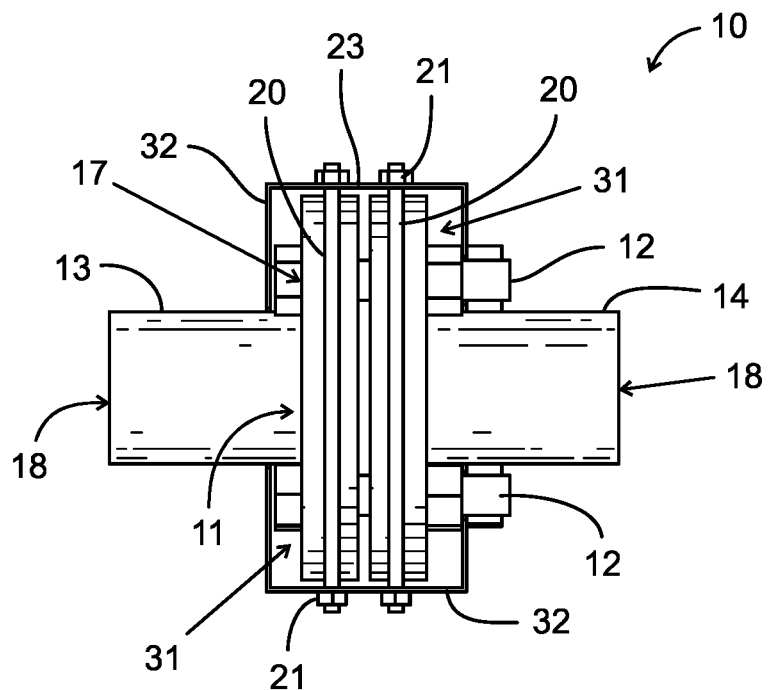
FIG. 4 is a bottom view of the embodiment of FIG. 1 from a perspective facing the side where the guard bolts secure the flange.
Figure 5:
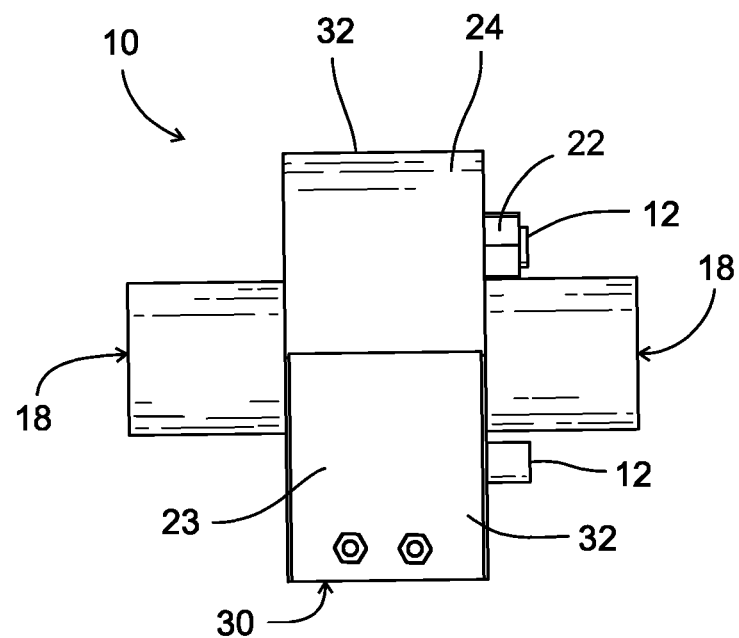
FIG. 5 is a side view of the embodiment of FIG. 1.
Figure 6:
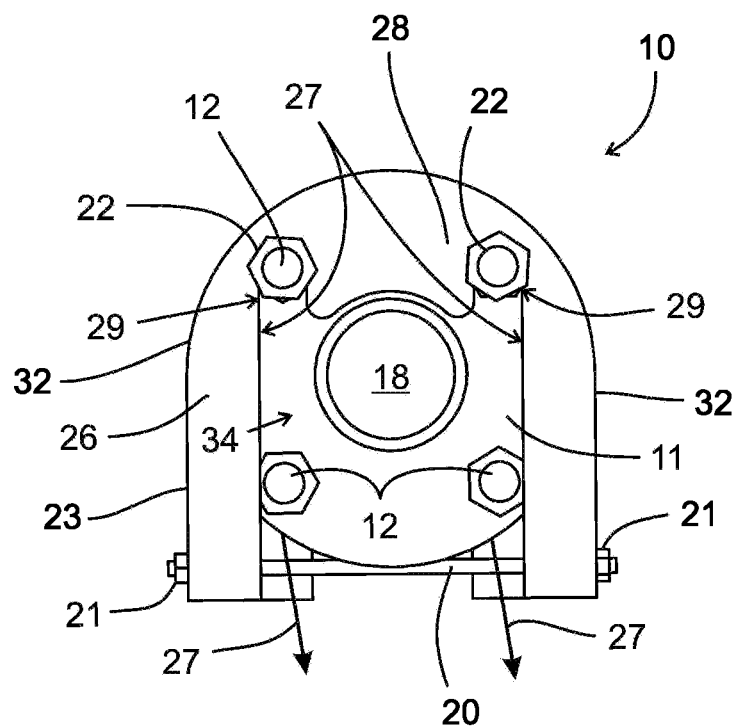
FIG. 6 is a front view of the embodiment of FIG. 1.
Figure 7:
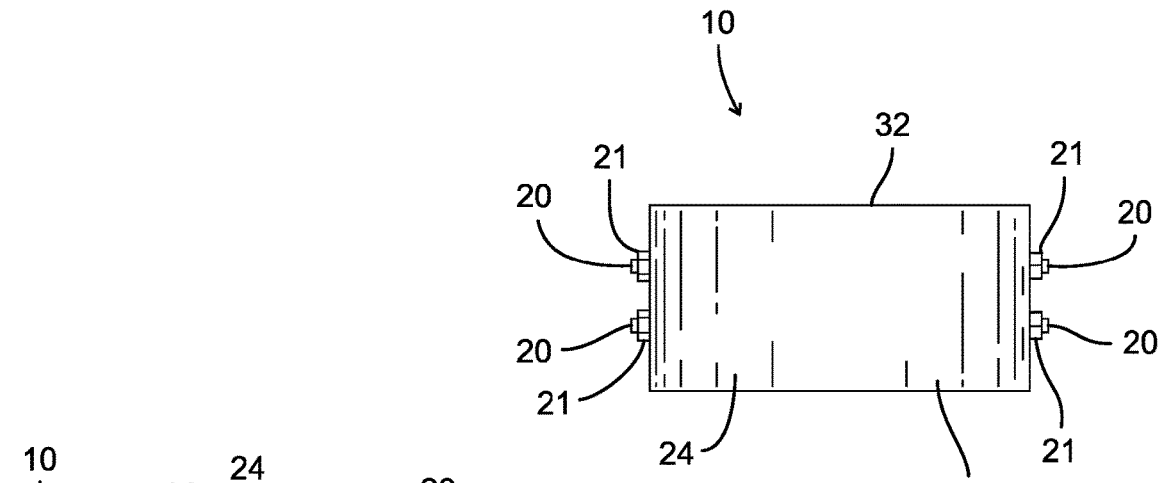
FIG. 7 is a top partial view of the embodiment of FIG. 1, wherein the embodiment is not attached to a flanged pipe connection.

The front side plate 26 can be used to attach housing 32 to the flanged pipe coupling bolts 12 as seen in FIGS. 3 and 6. The front side plate 26 of the housing 32 can have a shape such as the one shown in FIG. 10 in order to prevent rotation of the housing 32 and preferably allow for the housing 32 to be securely attached to the coupling 11. Connecting plate 23 preferably spans from front side plate 26 to rear side plate 25.

Figure 2:
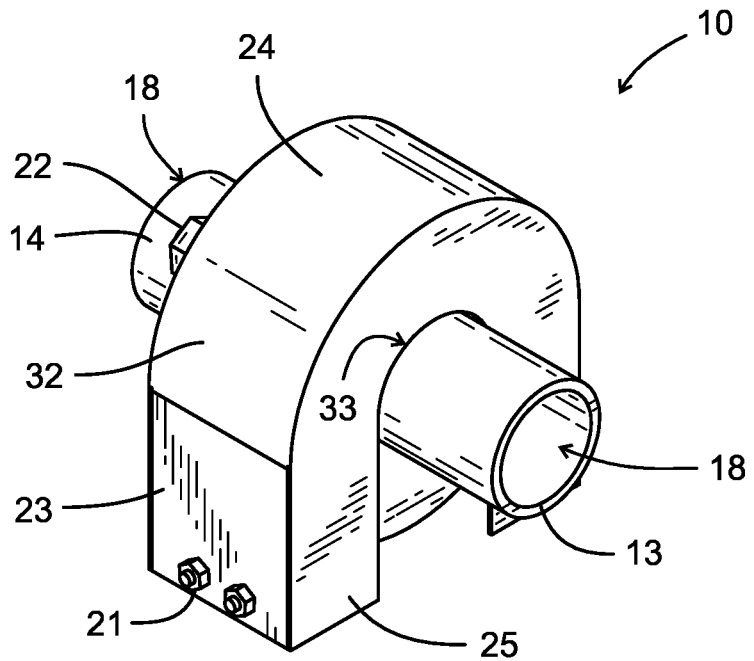
FIG. 2 is a rotated view of the embodiment of FIG. 1.
Figure 8:
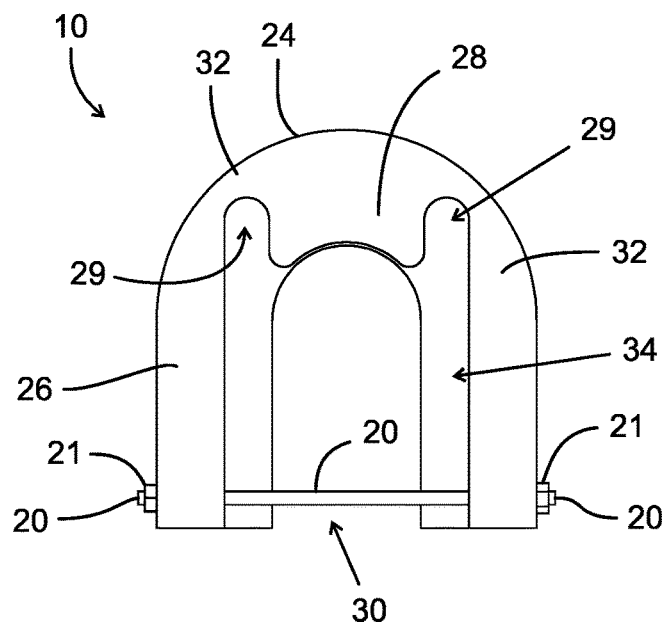
FIG. 8 is a front perspective view of the embodiment of FIG. 1 wherein the embodiment is not attached to a flanged pipe connection.
Figure 9:
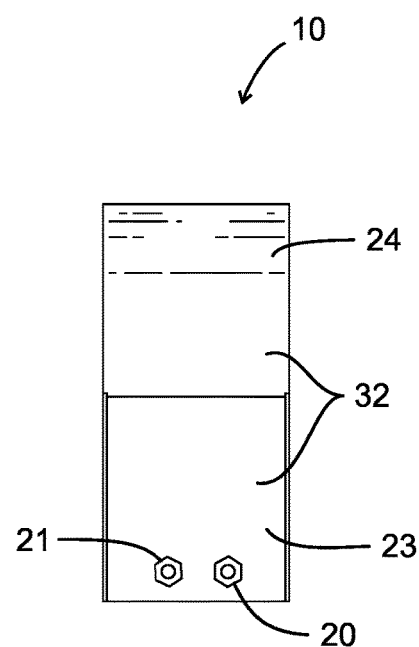
FIG. 9 is a side view of the embodiment of FIG. 1 wherein the embodiment is not attached to a flanged pipe connection.
Figure 10:
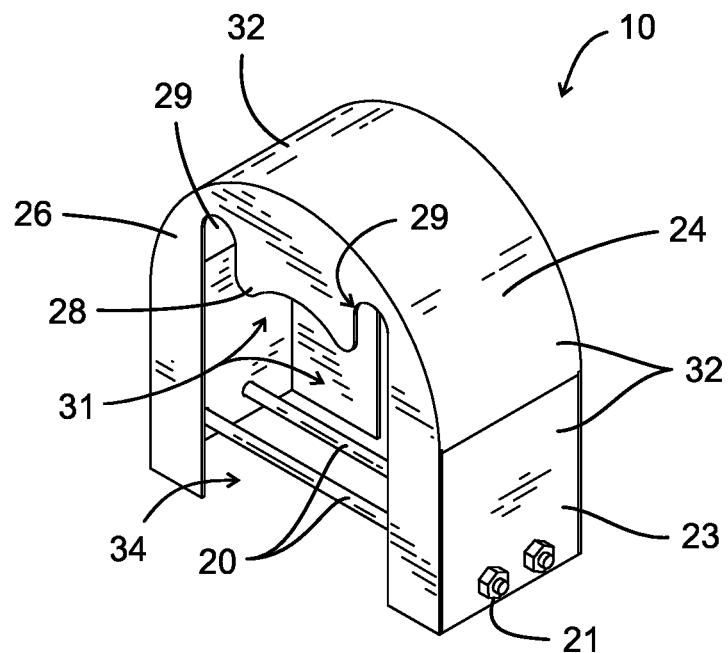
FIG. 10 is a top perspective view of the embodiment of FIG. 1 wherein the embodiment is not attached to a flanged pipe connection.
Figure 11:
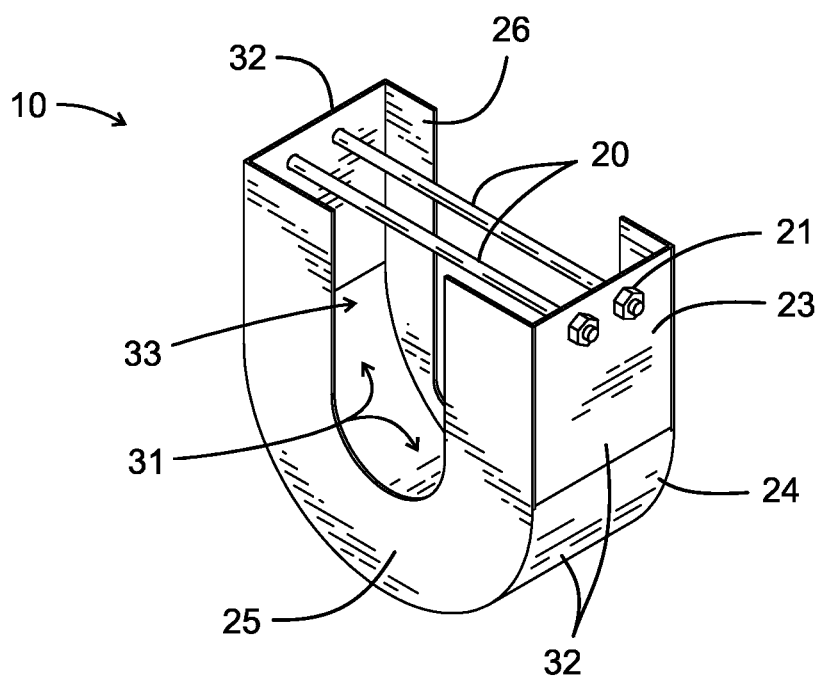
FIG. 11 is a bottom perspective view of the embodiment of FIG. 1 wherein the embodiment is not attached to a flanged pipe connection.

The rear side plate 25 of the housing 32 can have a slot or recess 33 that is preferably shaped to secure around the pipe section 13 as seen in FIG. 2. As shown in FIGS. 8 and 10, the front side plate 26 preferably has a slot or recess 34 and an extension or reinforcing piece 28 with slots 29 which preferably allows for the securing of the coupling 11 to the housing 32 with nuts 22 that are a part of the bolted connections that secure the pipe flanges 15, 16 together as seen in FIGS. 1-6. Although preferably only two nuts 22 are utilized to secure housing 32 to coupling 11, it is anticipated that other embodiments could exist wherein similar extensions to extension 28 exist next to the other bolts 12, preferably allowing for further securing of the coupling 11 to the housing 32. It should be understood that a bolt 12 or a nut 22 could interface or interlock with housing 32 to prevent rotation of housing 32 relative to flanges 15 or 16.

The dimensions of the invention will vary depending on the size of the coupling the shield is attached to.

As seen in the figures, and identified by arrows 27, the shield has an anti-rotation design which ensures that the spray of any leakage from flanges 15, 16 should occur in the desired direction (of arrows 27).

PARTS LIST

The following is a list of parts and materials suitable for use in the present invention:

| Parts Number | Description |
| --- | --- |
| 10 | Apparatus of a preferred embodiment of the present invention/shield apparatus deflector |
| 11 | flanged pipe coupling/flanged connection |
| 12 | flanged pipe coupling bolt |
| 13 | section of pipe |
| 14 | section of pipe |
| 15 | flange/pipe flange/annular flange |
| 16 | flange/pipe flange/annular flange |
| 17 | opening/flange opening |
| 18 | flow bore |
| 20 | guard bolt |
| 21 | nut |
| 22 | nut |
| 23 | connecting plate |
| 24 | closed end |
| 25 | rear side of housing/rear plate |
| 26 | front side of housing/front plate |
| 27 | arrow |
| 28 | extension of front side of shield/reinforcement piece |
| 29 | slot |
| 30 | open end portion |
| 31 | interior/housing interior |
| 32 | housing/cover/shroud |
| 33 | slot/recess |
| 34 | slot/recess |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An apparatus for shielding leakage from a flanged pipe coupling having multiple bolted connections that secure a first pipe section and flange to a second pipe section and flange comprising:
 a housing having a front wall, a rear wall, and a top wall, said top wall depending downwardly to form side walls intermediate said front and rear walls thus forming a closure having a bottom which is open;
 wherein the housing contains an interior space in between the front and rear walls and below the top wall, said interior space shaped to fit around a flanged pipe coupling;
 wherein the housing is shaped so as to prevent rotation of the apparatus with respect to the flanged pipe coupling;
 wherein the front wall is shaped so as to allow the securing of the front wall to one or more of said bolted connections; and
 wherein the housing is secured to the flanged pipe coupling bolts with one or more nuts.

2. The apparatus of claim 1 wherein the front wall and rear wall of the housing extend from the top wall to the pipe sections of the flanged coupling.

3. The apparatus of claim 1, wherein the rear wall is wider than the front wall, has a u-shape, and surrounds one half of the first and second pipe sections of the coupling.

4. The apparatus of claim 1 wherein the side walls are secured to each other.

5. The apparatus of claim 1 which the housing is made from 300 series stainless steel.

6. The apparatus of claim 1 which the housing is made of any material that can withstand the heat of steam.

7. The apparatus of claim 1 which the apparatus is for deflecting steam.

8. The apparatus of claim 1 which the apparatus is for deflecting leakage.

9. The apparatus of claim 1 which the apparatus is for deflecting any material transported by the pipe sections of the flanged coupling.

10. An apparatus for shielding leakage from a flanged pipe coupling having multiple bolted connections that secure a first pipe section and flange to a second pipe section and flange comprising:
 a housing having a front wall, a rear wall, and a top wall, said top wall depending downwardly to form side walls intermediate said front and rear walls thus forming a closure having a bottom which is open;
 wherein the housing contains an interior space in between the front and rear walls and below the top wall, said interior space shaped to fit around a flanged pipe coupling;
 wherein the housing is shaped so as to prevent rotation of the apparatus with respect to the flanged pipe coupling; and
 wherein one or more guard bolts secure the side walls to each other.

11. The apparatus of claim wherein two guard bolts secure the side walls to each other.

12. The apparatus of claim 11 wherein the side walls have a reinforcing plate where the coupling bolts are attached to the housing.

13. A flanged pipe connection shield apparatus, comprising:
  a) a first pipe section fitted with a first annular flange;
  b) a second pipe section fitted with a second annular flange;
  c) a plurality of bolted connections that hold the first and second annular flanges together in a connected flanges position;
  d) a flow bore that enables fluid flow from the first pipe section to the second pipe section and through said first and second annular flanges;
  e) a u-shaped housing having an interior that is configured to collect and channel any fluid leaking from the flanges toward a selected direction;
  f) said housing including an open end portion that enables entry of said connected flanges to said housing interior;
  g) a first plate section that has a slot sized and shaped to conform to part of the outer surface of the first pipe section;
  h) a second plate section having one or more slots that are each sized and shaped to conform to each said flange bolted connection;
  i) a third plate section that defines a closed end opposite said open end, said third plate section spanning from the first plate section to the second plate section; and
  wherein the flange bolted connection includes at least one flange bolt and at least one flange nut, wherein the second plate section has multiple slots each said slot is receptive of a respective flange bolt of said flange bolted connection.

14. The shield apparatus of claim 13, wherein the flange bolt, flange nut, second plate section and slot are configured to prevent rotation of the housing relative to the pipe sections.

15. The shield apparatus of claim 13 wherein at least one said flange bolt and at least one said flange nut hold the second plate section against said second annular flange.

16. The shield apparatus of claim 13 wherein at least one said flange bolt and at least one said flange nut compress the second plate into contact with the second annular flange.

17. A method of deflecting leakage of material transported by pipe in a preferred direction utilizing the apparatus of claim 12.

* * * * *